United States Patent [19]
Bennett et al.

[11] Patent Number: 5,424,024
[45] Date of Patent: Jun. 13, 1995

[54] APPARATUS FOR AND METHOD OF PREPARING A HARDENABLE SUBSTANCE FOR STORAGE

[75] Inventors: John C. Bennett, Northumberland; David Saul, Newcastle Upon Tyne, both of England

[73] Assignee: Northern Engineering Industries plc, Derby, England

[21] Appl. No.: 146,111

[22] PCT Filed: Apr. 28, 1992

[86] PCT No.: PCT/GB92/00778
§ 371 Date: Apr. 1, 1994
§ 102(e) Date: Apr. 1, 1994

[87] PCT Pub. No.: WO92/20470
PCT Pub. Date: Nov. 26, 1992

[30] Foreign Application Priority Data
May 11, 1991 [GB] United Kingdom ................ 9110251

[51] Int. Cl.$^6$ ................................ B28B 7/24
[52] U.S. Cl. ..................... 264/267; 249/83; 249/91; 249/119; 264/279; 264/279.1; 264/DIG. 69
[58] Field of Search ............... 264/279, 267, DIG. 69, 264/313, 279.1; 249/91, 83, 117, 119, 127, 135

[56] References Cited

U.S. PATENT DOCUMENTS

| | | | |
|---|---|---|---|
| 3,434,911 | 3/1969 | Johnson et al. | 264/279 X |
| 3,455,483 | 7/1969 | Inklaar | 264/267 X |
| 3,479,704 | 11/1969 | Reed | 264/267 X |
| 3,634,565 | 1/1972 | Schaerer | 264/267 X |
| 4,335,560 | 6/1982 | Robinson . | |
| 4,600,459 | 7/1986 | Proctor | 264/267 X |
| 4,717,510 | 1/1988 | James | 264/255 X |
| 4,859,395 | 8/1989 | Unger et al. | 264/255 X |
| 5,008,045 | 4/1991 | Manchak, Jr. et al. | 264/36 X |
| 5,032,328 | 7/1991 | Griffis . | |
| 5,106,554 | 4/1992 | Drews | 264/DIG. 69 X |
| 5,188,790 | 2/1993 | Magnant | 264/267 X |

FOREIGN PATENT DOCUMENTS
3735008 5/1989 Germany .

*Primary Examiner*—Karen Aftergut
*Attorney, Agent, or Firm*—Cushman Darby & Cushman

[57] ABSTRACT

Waste products which are to be disposed of by burial, are mixed with a hardening substance in bags which are wrapped around circular or approximately circular frames. The circular shape enables efficient mixing. The bagged frames are placed in a rectangular mould and the bags then filled and the contents mixed by stirring; the wrappings are released and the mixes settle into the shape of the rectangular interior of the mold and fill it, thus adopting the most efficient storage shape.

15 Claims, 2 Drawing Sheets

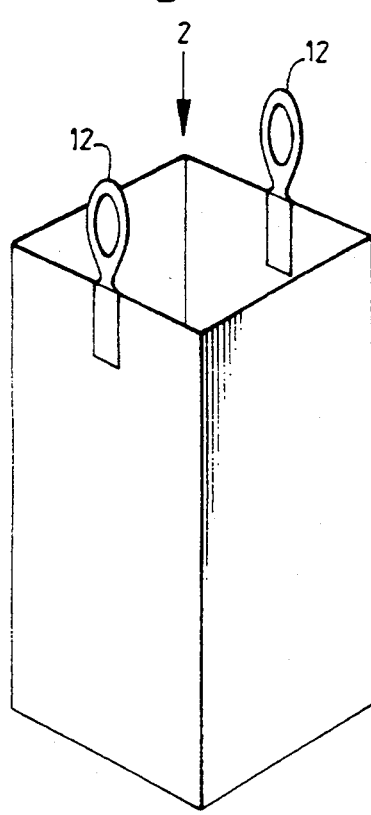
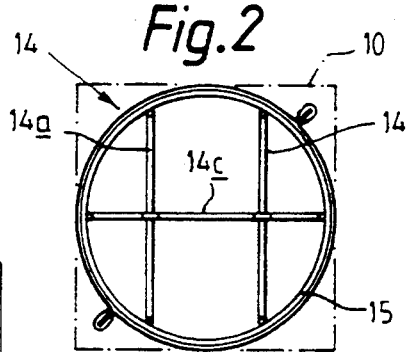
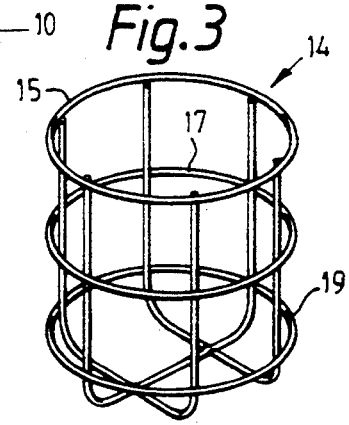
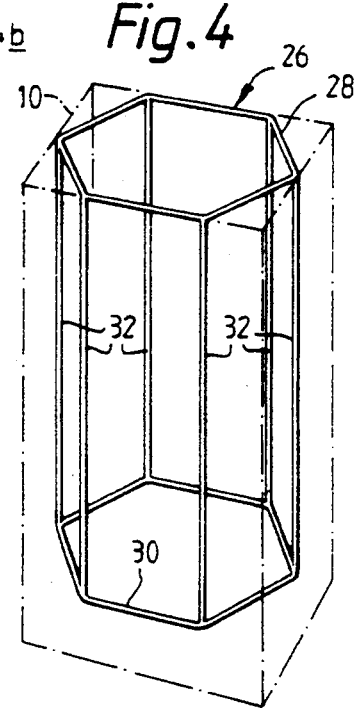
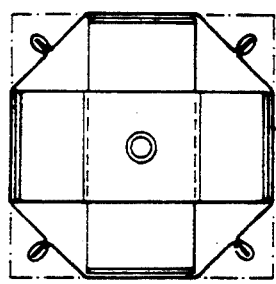
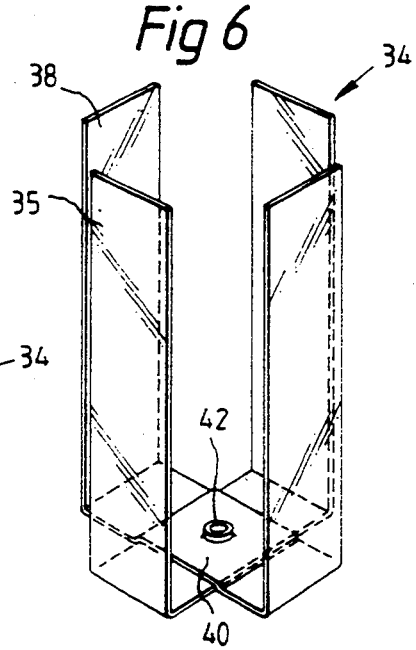
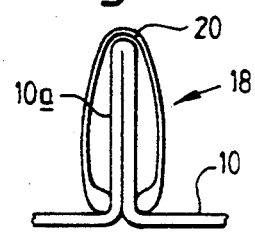

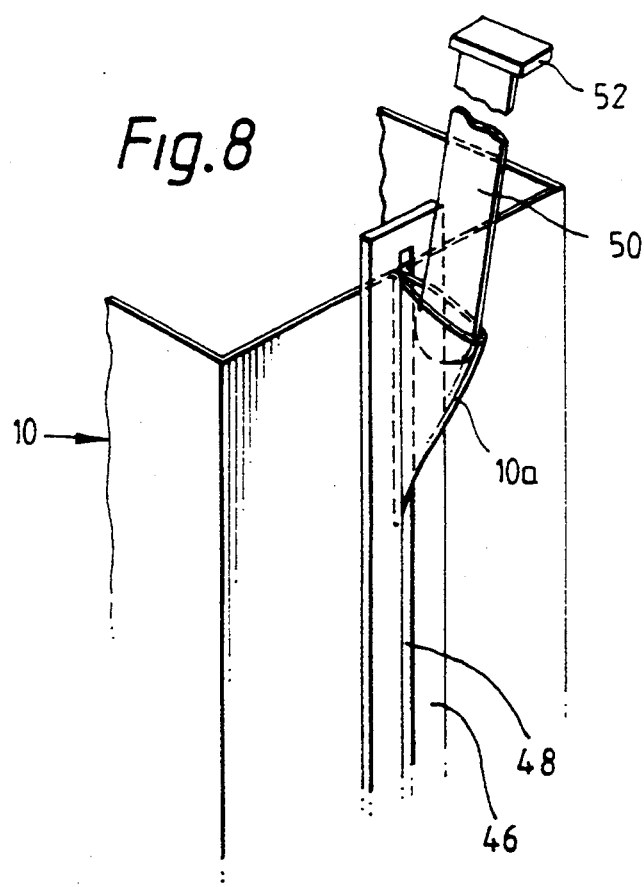
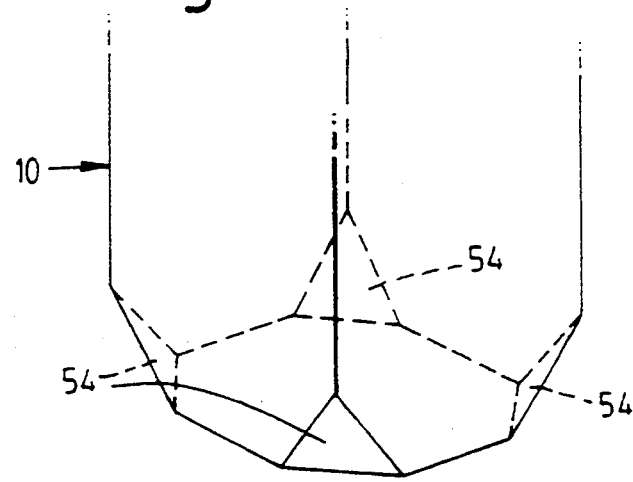
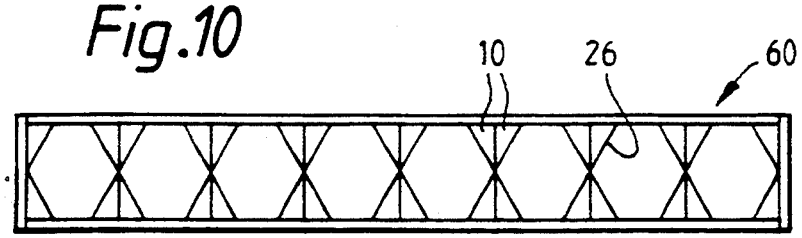

APPARATUS FOR AND METHOD OF PREPARING A HARDENABLE SUBSTANCE FOR STORAGE

FIELD OF THE INVENTION

The present invention relates to apparatus for storing substances which have to be mixed prior to storage.

Some industrial processes produce by-products which cannot be disposed of by simple tipping or burning, because such action may result in damage to the environment and/or to life forms in close proximity to the tipped or burned substances.

BACKGROUND OF THE INVENTION

A common manner of disposal of such substances as those generally referred to hereinbefore, is to put them in metal drums, along with a solidifying agent such as cement and, after curing of the whole, transporting them in metal, rectangular containers, to the storage site and burying everything in a specially prepared concrete container, which has already been prepared in the burying area.

The process is ongoing, and consequently space is at a premium. However, the drums presently used are cylindrical and when a number of them are arranged in side-by-side touching relationships, spaces are defined between them. This generates two problems. One is lost storage space in a given volume containing the drums. The other is a danger that in the event of long term corrosion of the containing structure, the substance (normally the ground) in which the whole is buried, might sink into those spaces, as well as into cavities which form as a result of the corrosion.

Both lost storage volume and the sinking ground can be alleviated by the use of square metal drums, rather than round ones. Such drums however, are more costly relative to the circular ones, which normally are reclaimed oil drums. Moreover, it is vital to product quality that thorough mixing of the by-product with the solidifying agent is achieved, but the said mixing is difficult to achieve in the corners of a square receptacle, by any process. Steps presently taken with round drums includes filling the spaces between them with grout before infilling the burial chamber properly. This is also a time consuming process, and consequently expensive.

SUMMARY OF THE INVENTION

The invention seeks to provide an improved apparatus in which to mix and solidify waste products and a solidifying agent, so as to facilitate both thorough mixing and full utilisation of available storage space.

According to one aspect of the present invention apparatus for preparing a hardenable substance for storage comprises, in combination, a waterproof flexible bag, a skeletal frame which for use is inserted in the bag so as to enable said bag to be drawn about the frame so as to adopt its shape, which shape in use is effectively nearly circular or is substantially circular, clips for retaining the bag on the frame and a rectangular mould the interior length of which is a multiple of its interior width and the skeletal frame is proportioned so as to fit in engagement with the interior sides of the mould and to extend lengthwise thereof a distance equal to its interior width, and for use the skeletal frame is inserted in the bag which is drawn thereabout and held by clips and the whole is placed in the mould with other, identical bagged frames for the full interior length thereof.

According to a further aspect of the present invention a method of preparing a hardenable substance for storage comprises the steps of inserting a skeletal frame in a flexible, waterproof bag, drawing the bag about the frame so as to adopt its shape, which shape in use is effectively nearly circular or substantially circular, retaining the bag on the frame by clips, placing the bagged frame along with other, identical bagged frames in a rectangular mould which is so proportioned as to be engaged via its side and end walls with respective bagged frames, filling each bag with a waste product, water and hardening agent, stirring the mixes to achieve a substantially even dispersion of the waste material and the hardening agent and then removing the clips so as to enable the now viscous mixes to settle and so force the walls of their respective bags against each other and the walls of the mould, to be constrained thereby to adopt a square cross-section shape and leaving the mixes in the mould until they have hardened.

BRIEF DESCRIPTION OF THE DRAWINGS

The invention will now be described, by way of example and with reference to the accompanying drawings in which:

FIG. 1 is a pictorial view of a bag in accordance with the present invention.

FIG. 2 is a plan view of a frame in accordance with the present invention.

FIG. 3 is a pictorial view of the frame of FIG. 2.

FIG. 4 is a pictorial view of an alternative frame.

FIG. 5 is a plane view of a further alternative frame.

FIG. 6 is a pictorial view of the frame of FIG. 5.

FIG. 7 is an end view of drawing and clamping means;

FIG. 8 is a pictorial view of alternative drawing and clamping means; and

FIG. 9 depicts an alternative bag shape.

FIG. 10 is a plane view of a mould containing bags of the present invention.

Referring to FIG. 1, a bag 10 in the present example is made from a waterproof material such as nylon, and has a square cross sectional shape. A pair of loop handles 12 are fitted at the upper, open end of the bag 10, to facilitate moving the bag 10 when full.

The bag 10 in the present example, is to be used for the receipt of a waste substance, water and a solidifying agent such as cement, all of which is to be mixed in the bag when it is in-situ in a mould. It is important that the substance and cement be evenly mixed. However, though the square shape of the bag facilitates maximum use of storage space, it makes difficult, mixing of the ingredients by stirring with a rotating paddle (not shown). The substances tend to move into the corners of the square, but not in the form of a proper dispersion within each other.

Referring now to FIG. 2. In order to counter the aforementioned disadvantage, the invention provides a frame e.g. frame 14, in the shape of a trio of 'U' shaped rods 14a, 14b and 14c and the upper hoop 15 of a trio of hoops. Rods 14a and 14b are parallel with each other, and 14c bridges them, such that when the rods are joined by external hoops, a skeletal circular cross-sectional shape is defined. The construction of the frame 14 is more clearly seen in FIG. 3, as are the trio of hoops 15, 17 and 19.

For operation the bag 10 is drawn about the frame 14, so as to adopt its shape. This generates folds 10a in the bag, which are clipped together, for example, by clips 20, which are best seen in FIG. 7. The bag 10 holds its new shape.

In operation a number of bags 10 are each drawn about respective frames and clipped so as to adopt and maintain the circular shapes of the frames. The bags 10 are then placed in a row in the mould 60 (FIG. 10) the proportions of which are such that the mould is filled therewith.

A known mixing device (not shown) is positioned over an end bag 10 and lowered so that a paddle it supports enters the bag 10, within the frame 26, and a cap the device carries closes the open end of the bag 10.

The cap has inlets through which waste substance, water and cement are passed into the bag, after which the paddle is rotated to effect mixing of the contents. This step is repeated for each bag. When mixing of the contents of the last bag in the row is completed, the device is removed, leaving the paddle in the bag if desired. In any event, all of the frames are left in their respective bags.

At that stage, the clips 20 are also removed and the contents of the bags 10 settle, spreading through the skeleted frame 14 thus causing the sides of the bag 10 to press against each other and the sides of the mould 60. By this means, the bags 10 are constrained to revert to their square cross-sectional shapes, and are left in the mould until their contents are solidified and are thus self supporting in their square cross-sectional shapes.

When the contents of the bags 10 have solidified, the bags 10 are transferred to a metal container, the proportions of which are such as to ensure that it can be completely filled by a pre-selected number of full bags. The container is then transported to the burial site and buried with the bags in it, without any need for grouting.

A further embodiment of the present invention is depicted in FIG. 4, wherein a polygonal space frame 26 is formed, by connecting two polygonal sub frames 28 and 30, via a number of rods 32. The space frame 26 is dimensioned so as to fit in the bag 10 with the flats and corners of the space frame 26 engaging respective walls of the bag 10, without deforming them. The bag 10 is then folded and clipped as previously described, at a sufficient of its corners to tighten the bag 10 about the space frame 26, and so form a columnar polygon, and is thereafter positioned in a mould 60 along with other bags 10, to complete a row, ready for filling and mixing, as described hereinbefore.

In FIG. 5, the bag 10 is drawn as previously described, about a frame 34 which has four legs, so as to form an octagonal polygon, which more closely approximates a circle than does a six sided polygon. Again, the preferred arrangement is such that the frame 34 initially fits in engagement with the walls by the bag 10, without deforming them.

In FIG. 6, the frame 34 is seen to be formed from two 'U' shaped sheet members 35 and 38. The base of the member 38 overlaps the base of the member 35 and its overlapping portion 40 includes a central boss 42. The boss 42 is formed so as to receive the free end of the paddle (not shown) the other end of which, for operation, is attached to a drive motor on the device (not shown) for rotation thereby within the bag.

At the end of the mixing process, if the substance is particularly toxic or reactive, the paddle can be detached from the drive motor and left in the mix.

Referring now to FIG. 7. The folded side 10a of the bag 10, is trapped by the edges of the 'U' section resilient strip 20 mentioned hereinbefore, the length of which is equal to the length of the folded wall portion 10a.

The strip 20 may be substituted by elongated bulldog clips (not shown) or any other suitable gripping means.

An alternative gripping device is depicted in FIG. 8. An elongated strip 46 has a slot 48 in it and which extends for most of its length. The top corner of the leading edge of the fold 10a is threaded through the slot 48, a distance sufficient to enable the insertion of the end of the locking bar 50 between the sides of the fold. The bar 50 is then pushed down the fold, so pulling the remainder of the length of the fold through the slot 48. The bar 50 is provided with a head 52 which prevents it from passing through the fold in a downward direction. The bar 50 can then be pulled out in an upward direction when it is desired to release the fold.

A drawback which is generated by the deforming of a square bag into a cylinder or polygon, is that the closed end of the bag 10 will not deform into the new shape, by virtue of the rigidity provided by its juncture with its said walls. Thus, some concentration of substance could occur in that area. This situation can be alleviated, at least in part, by forming the bottom of the bag 10 into an appropriate polygonal shape, as depicted in FIG. 9, to which reference is now made.

The bag 10 when manufactured, has its corners 54 upturned about the lines of the flats of the polygon, such that when four bags are stored next to each other, a pyramid shaped void is defined between them. This will have the effect of raising the corner surfaces of the bag interior towards the mix, and so affords a more efficient mixing action in those areas.

The voids created will not be the cause of sinking of the ground after burial because the upper surfaces of the solidified mixture will still present a planar surface for the purpose of ground support.

In all of the embodiments, the bag 10 will have to be longer than would be needed in order to store a given volume of the mixture, because the circular or polygonal shapes formed as described hereinbefore, will have a volume less than that necessary to store the given volume. On release of the clips, the mixture will settle at a level which indicates the given volume, and the frames will protrude a small distance above the upper surface of their respective mixes.

Whilst in the foregoing description, the emphasis has been placed on the use of square bags, having read this specification, the skilled man will appreciate, that ordinary bags may be utilised, provided their cross-sectional periphery is sufficiently long as to enable forming of the appropriate square on settling of the mix therein.

We claim:

1. Apparatus for preparing a hardenable substance for storage comprising, in combination, a waterproof flexible bag having a base, a skeletal frame having a cross-sectional shape approximating a circle, clips for retaining said bag on said frame, and a rectangular mould having interior sides and an interior length which is a multiple of an interior width thereof, said skeletal frame being proportioned to fit in engagement with said interior sides of said mould and to extend lengthwise thereof a distance equal to said interior width of said mould with said skeletal frame insertable into said bag with said bag being drawn around said frame so as to assume and retain said shape of said frame by clipping with said clips resulting folds in said bag to form a bagged frame and with said bagged frame placed in said mould with other, identical bagged frames to fill said mould.

2. Apparatus as claimed in claim 1 wherein the bag (10) has a square cross-sectional profile.

3. Apparatus as claimed in claim 1 wherein the skeletal frame (14) has a circular cross-sectional profile.

4. Apparatus as claimed in claim 1 wherein the frame (14) is polygonal in cross-section.

5. Apparatus as claimed in claim 4 wherein the polygonal shape of the frame (14) comprises an even number of sides.

6. Apparatus as claimed in claim 5 wherein the polygonal frame (14) has at least six sides.

7. Apparatus as claimed in claim 1 wherein said bag (10) includes loops (12) affixed to its sides at its open end, for handling purposes.

8. Apparatus as claimed in claim 1 wherein the bag (10) is made from a substantially chemically inert material.

9. Apparatus as claimed in claim 8 wherein the material is nylon.

10. Apparatus as claimed in claim 1 wherein said frame (14) comprises an assembly of rods with at least some of said rods having a U shape.

11. Apparatus as claimed in claim 2 wherein said frame (14) comprises an assembly of sheet members having a U shape.

12. Apparatus as claimed in claim 4 wherein the frame (14) comprises polygonal ends joined by straight rods.

13. Apparatus as claimed in claim 11 wherein said sheet members include a boss with said boss being located at one end of said assembly which serves as a bottom end of said assembly.

14. Apparatus as claimed in claim 1 wherein said bag has a closed end defining said base of said bag and said closed end having corners which are upturned from said base.

15. A method of preparing a hardenable substance including waste product for storage comprising the steps of: inserting a skeletal frame (14) in a flexible, waterproof bag (10), drawing said bag (10) about said frame (14) so as to adopt said shape of said frame, which shape in use is substantially circular, retaining said bag (10) on said frame (14) by clips (20) to form a bagged frame, placing said bagged frame along with other, identical bagged frames in a rectangular mould which is so proportioned as to be engaged via its side and end walls with respective bagged frames, filling each bag (10) with a waste product, water and hardening agent to form a mix, stirring said mix in each bag to achieve a substantially even dispersion of said waste product and hardening agent and then removing said clips (20) so as to enable said mix, which is now viscous, in each bag to settle and so force walls of each of said bags (10) against each other and walls of said mould (60), to be constrained thereby to adopt a square cross-section shape and leaving said mix in said mould (60) until it has hardened.

* * * * *